(12) United States Patent
Kandlur et al.

(10) Patent No.: US 10,735,370 B1
(45) Date of Patent: Aug. 4, 2020

(54) NAME BASED INTERNET OF THINGS (IOT) DATA DISCOVERY

(71) Applicant: International Business Machines Corporation, Armonk, NY (US)

(72) Inventors: Dilip Dinkar Kandlur, San Jose, CA (US); Douglas M. Freimuth, New York, NY (US); Thai Franck Le, White Plains, NY (US); Erich Nahum, New York, NY (US); Jorge Jose Ortiz, Rego Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/288,869

(22) Filed: Feb. 28, 2019

(51) Int. Cl.
| | |
|---|---|
| H04L 29/06 | (2006.01) |
| H04L 29/08 | (2006.01) |
| H04L 29/12 | (2006.01) |
| G06F 9/54 | (2006.01) |
| G06F 8/65 | (2018.01) |
| G06F 15/16 | (2006.01) |

(52) U.S. Cl.
CPC .......... *H04L 61/1511* (2013.01); *G06F 9/542* (2013.01); *H04L 61/1541* (2013.01); *H04L 67/12* (2013.01); *H04L 67/303* (2013.01)

(58) Field of Classification Search
USPC ........................ 709/220, 224, 223, 249, 247
See application file for complete search history.

(56) References Cited

U.S. PATENT DOCUMENTS

| | | | | |
|---|---|---|---|---|
| 8,347,394 | B1* | 1/2013 | Lee ..................... | H04L 61/1511 726/22 |
| 9,578,567 | B1* | 2/2017 | Laganier ............. | H04L 41/0668 |
| 2002/0010798 | A1* | 1/2002 | Ben-Shaul ........ | H04L 29/12066 709/247 |
| 2003/0172145 | A1* | 9/2003 | Nguyen ................. | G06Q 10/10 709/223 |
| 2004/0103170 | A1* | 5/2004 | Borzilleri .......... | H04L 29/12066 709/220 |
| 2016/0197989 | A1* | 7/2016 | Galliano ............... | H04L 67/101 709/224 |
| 2016/0203234 | A1* | 7/2016 | Piccand ................ | G06F 40/284 707/798 |
| 2016/0205078 | A1* | 7/2016 | James ................. | H04L 63/0442 713/171 |

(Continued)

OTHER PUBLICATIONS

Guo, H., et al., "IP-Based IoT Device Detection", Proceedings of the 2018 Workshop on IoT Security and Privacy (IoT S&P '18), Aug. 20, 2018, 7 pages.

(Continued)

*Primary Examiner* — Jude Jean Gilles
(74) *Attorney, Agent, or Firm* — Scully, Scott, Murphy & Presser, P.C; Joseph Petrokaitis

(57) ABSTRACT

Name based Internet of Things (IoT) discovery includes receiving domain name system (DNS) events. An Internet Protocol (IP) address to name mapping is built based on the DNS events. A data communication event occurring in a computer network is received. A destination IP address in the data communication event is mapped to a domain name by querying the IP address to name mapping. Whether the data communication event is associated with an IoT device is determined based on the domain name satisfying a rule.

20 Claims, 12 Drawing Sheets

(56) References Cited

U.S. PATENT DOCUMENTS

| | | | |
|---|---|---|---|
| 2016/0205097 A1* | 7/2016 | Yacoub | H04W 12/10 |
| | | | 726/6 |
| 2016/0205106 A1* | 7/2016 | Yacoub | H04W 12/04033 |
| | | | 726/28 |
| 2016/0259932 A1* | 9/2016 | Lakshmanan | H04W 4/029 |
| 2016/0337181 A1 | 11/2016 | Cathrow et al. | |
| 2017/0180380 A1 | 6/2017 | Bagasra | |

OTHER PUBLICATIONS

Sivanathan, A., et al., "Characterizing and Classifying IoT Traffic in Smart Cities and Campuses", 2017 IEEE Conference on Computer Communications Workshops (Infocom Wkshps), May 1-4, 2017, 6 pages.

NIST, "NIST Cloud Computing Program", http://csrc.nist.gov/groups/SNS/cloud-computing/index.html, Created Dec. 1, 2016, Updated Oct. 6, 2017, 9 pages.

\* cited by examiner

NAME BASED INTERNET OF THINGS (IOT) DATA DISCOVERY

STATEMENT REGARDING FEDERALLY SPONSORED RESEARCH OR DEVELOPMENT

This invention was made with United States government support under a contract awarded by a Federal agency. The government has certain rights in the invention.

BACKGROUND

The present application relates generally to computers and computer networks, and more particularly to Internet of Things discovery.

Current mechanisms for Internet of Things (IoT) data discovery manually analyze an application flow and decompose it based on documentation and application programming interface (API) specifications. Software analysis tools may be used for manual discovery once the documentation and specifications are understood. IoT, however, includes a fast moving area of technology, in which new devices and applications can appear frequently, for example, daily.

BRIEF SUMMARY

A name based IoT discovery method and system may be provided. The method, in one aspect, may include receiving domain name system (DNS) events. The method may also include building an Internet Protocol (IP) address to name mapping based on the DNS events. The method may also include receiving a data communication event occurring in a computer network. The method may further include mapping a destination IP address in the data communication event to a domain name by querying the IP address to name mapping. The method may also include determining whether the data communication event is associated with an IoT device based on the domain name satisfying a rule.

A name based IoT discovery system may include at least one hardware processor configured to receive domain name system (DNS) events. The hardware processor may be further configured to build an Internet Protocol (IP) address to name mapping based on the DNS events. The hardware processor may be further configured to receive a data communication event occurring in a computer network. The hardware processor may be further configured to map a destination IP address in the data communication event to a domain name by querying the IP address to name mapping. The hardware processor may be further configured to determine whether the data communication event is associated with an IoT device based on the domain name satisfying a rule.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
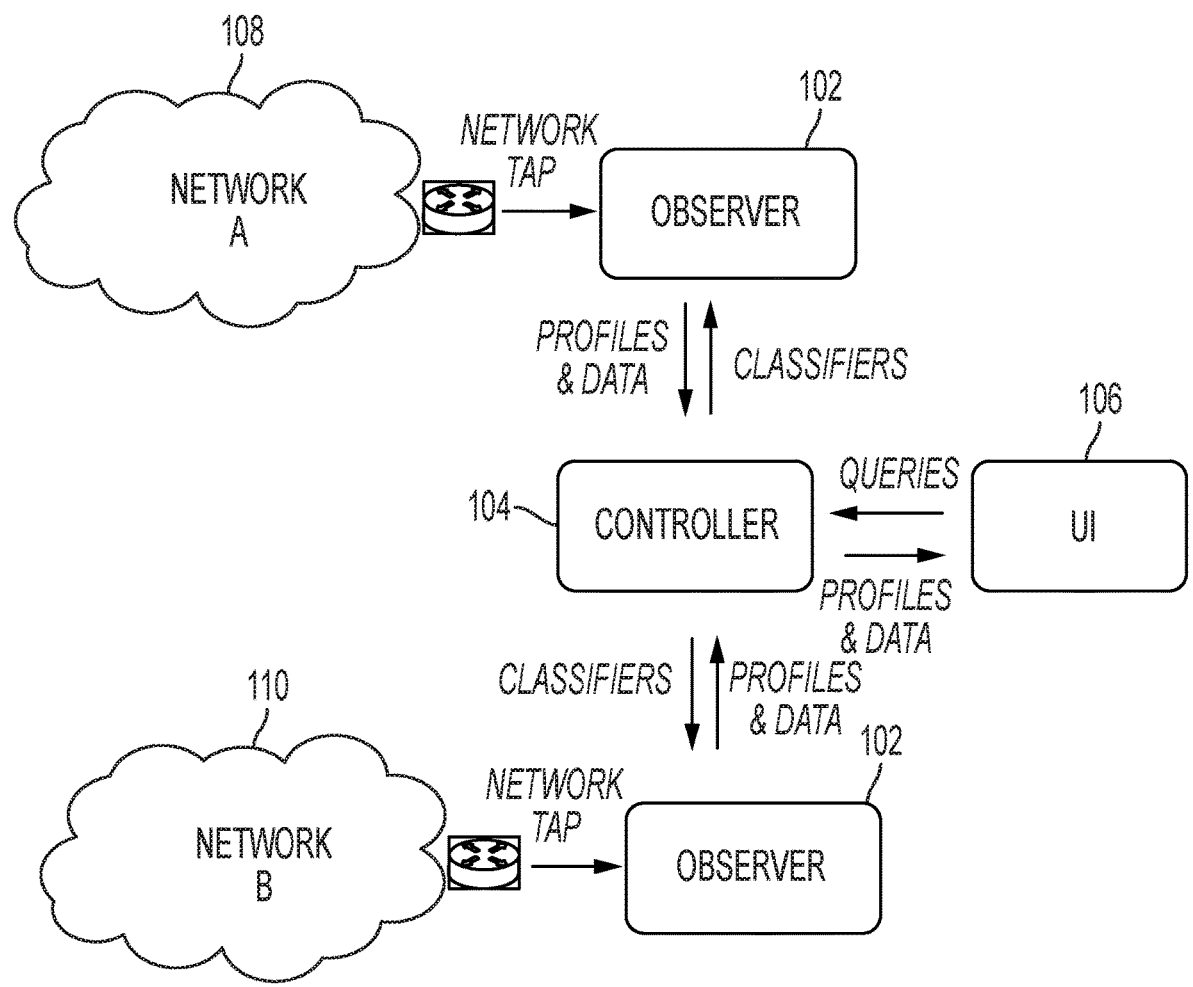
FIG. 1 is a diagram showing distributed architecture in one embodiment.

Automated discovery of Internet of Things (IoT) data based on information collected from streaming data is disclosed. In one aspect, an initial name space serves as a seed for understanding existing IoT device behaviors and the name space is extended by learning from new devices and applications. In one aspect, a domain name system (DNS) based discovery may be performed. Other protocols including hypertext transfer protocol (HTTP) and Transport Layer Security (TLS) may provide additional discovery data.

In one embodiment, a namespace is used to capture from a protocol, information in streaming data. Information capture can be used to understand and decompose device behaviors on an IoT network. In one aspect, connection information from Transmission Control Protocol (TCP), DNS queries, HyperText Transfer Protocol (HTTP) host, uniform resource identifier (URI), user agent fields, Secure Sockets Layer (SSL) server name and cypher suite are examples of names that can be parsed in the form of strings and matched for discovery. In one aspect, labeled IoT data can be used to inform what names are used in IoT data. A knowledge base can be created to enable searching. Matching and classifying data may be performed based on queries to the knowledge base. In one aspect, the method can be implemented or applied across data sets and networks that share the same name spaces.

In one aspect, a system and/or method may discover, identify and classify IoT flows. The methodology of the present disclosure may be used in various computing scenarios. In an example scenario, a cloud service provider may need to discover a network for a customer. For example, when an entity switches service providers, a new provider discovers the infrastructure of the entity it is to manage. As another example, an enterprise may need a method to control its infrastructure in an environment where new infrastructure is being added and existing IoT and non-IoT networks are being integrated with the new infrastructure.

In one aspect, IoT devices may include a new class of device, for example, which involves transitioning to a new class of devices. IoT can provide the inter-networking of physical devices (also referred to as "connected devices" and "smart devices") such as vehicles, buildings, and other items embedded with electronics, software, sensors, actuators, and network connectivity which enable these objects to collect and exchange data without assistance or interaction from a human. This new class of devices can have different behaviors than existing information technology (IT) devices. Devices in IoT class may have characteristic behavior that can be used to make them discoverable.

In one aspect, IT devices can have agents and management information bases (MIBs), which provide a generalized framework for managing the IT devices over a communication network such as the Ethernet and Transmission Control Protocol/Internet Protocol (TCP/IP). IoT devices have a broader set of protocols and environments such as automobiles, electronic devices, buildings and sensors. Normalizing the protocols and behaviors may help to create a generalized method of management and discovery for IoT to make the IoT more manageable. In one embodiment, a system and method of the present disclosure may use name based discovery to normalize protocols and/or behaviors within domains of IoT.

A system in one embodiment may create a database (DB) of names classified as IoT from labeled training data, capture protocol information such as DNS request and response, HTTP request and response, SSL hello exchange. With respect to DNS, the system in one embodiment may build an Internet Protocol (IP)-to-name mapping using DNS request and/or response, capture a connection request, perform an IP-to-name lookup from the mapping created previously, match DNS name to IoT based on one or more rules, and classify the associated connection as IoT responsive to a rule match.

With respect to HTTP, a method in one embodiment may match HTTP fields (e.g., host field, URI field) to IoT based on one or more rules, and classify an associated user identifier (uid) and subflow as IoT responsive to a rule match.

With respect to SSL, a method in one embodiment may match SSL hello exchange fields to IoT based rules, for example, one or more rules to match host or URI or parameter field names as IoT, classify an associated uid and subflow as IoT, responsive to a rules match. The method in one embodiment may also corroborate IoT classification across one or more of DNS, HTTP and SSL flows. In one aspect, corroboration may be performed on controllers. In one aspect, name based IoT discovery service can infer IoT from other protocols such as, but not limited to, IoT specific protocols and application data.

In one aspect, a system which provides name based IoT discovery may include a training subsystem, which trains a machine learning model based on labeled IoT data and protocol events such as, but not limited to, DNS, HTTP and SSL events. For instance, header information in protocols such as DNS, HTTP and Transport Layer Security (TLS) may be used. In one embodiment, training may employ web crawling and text mining to construct a set of site names of servers supporting IoT devices. A subsystem may build IP-to-name mapping from DNS name resolution or events that can be used with a connection, HTTP and SSL events to classify as IoT data. A subsystem may perform a rule based classification to discover IoT data traffic based on training data and mark connections. In one aspect, an IoT discovery system of the present disclosure can also mark flows as IoT or non-IoT with sub classes, including in an environment where addresses are NATed (e.g., translated). In one aspect, this rule based classification is based on destination endpoints and may work in network address translation performed (NATed) environments where IoT devices are behind a network address translation (NAT) or DNS proxy, which may obscure the source IP address of the requesting device. A device may be classified as IoT or non-IoT. For example, if a fully qualified domain name (FQDN) match is found, a device may be then marked as IoT. A subsystem may corroborate classification of connection across DNS and/or connection, HTTP and SSL and events.

In one aspect, name-based protocol header information may be used to identify possible IoT data flows. In one aspect, name-based information from protocol headers may be used to identify IoT device classes. A system that automatically discovers IoT devices may be trained based on labeled IoT data and protocol header information such as, but not limited to, DNS, HTTP and TLS header information (also referred to as named data) to automatically discover IoT devices. In one aspect, a model may be created using natural language processing (NLP) techniques (e.g. term frequency-inverse document frequency (TF/IDF)) to classify device type, device manufacturer, device model, operation system (OS), and application. Running the model may classify an IoT device with device type, device model, device manufacturer, OS, and Application. An example implementation of a trained model may include a vector with values. Each value in the vector may represent a weight that determines whether there is an existence in the discovered data of values in reference training set. A system of the present disclosure in one embodiment builds a database of IoT related "names" based on this classification (e.g., a unary name or set of names, DNS FQDN, HTTP user agent or URI, TLS cypher suite, host). A set of rules can be applied to the database for a given device to classify as IoT or other classes like IoT with subclass "Building". A system in one embodiment may also perform a technique such as cosine similarity to compare protocol header data with a reference set model to classify a device associated with the protocol header data.

FIG. 1 is a diagram showing distributed architecture in one embodiment. An observer component 102, in one aspect, may function as a network observation point. In one aspect, an observer component 102 may be selected, which may be a relatively low-resource machine, for example, a 1U server (designed to fill one unit of space in a server chasis), a laptop, or the like. Example functions the observer component 102 may perform may include extracting and filtering data, running classifiers and sending data to a controller component 104. An observer component 102 may receive network traffic data, for example, via a network test access point (tap) from a network 108. In one embodiment, there may be a plurality of observer components 102. In one aspect, each observer component 102 may monitor different data traffic. For instance, an observer component may monitor traffic from a network 108 and another observer component may monitor traffic from another network 110. A controller component 104 may be selected, which for example, may be a relatively high-resource server, for instance, a cluster of computers. Examples of functions the controller component 104 may perform may include coordinating observers, combining disparate sources of data, training new models and classifiers, and deploying classifiers to observers. A user interface (UI) component 106 may perform data exploration and profile inspection. UI in one aspect may be a web interface. For instance, searches may be performed on devices and results or profiles on devices may be stored in a database. For example, each device discovered from a search can have an associated profile stored in a database. Queries can be performed on stored profiles. Per device profiles can be refined in the system from the initial protocol events to eventual refinement representing the classification of a device.

Figure 2:
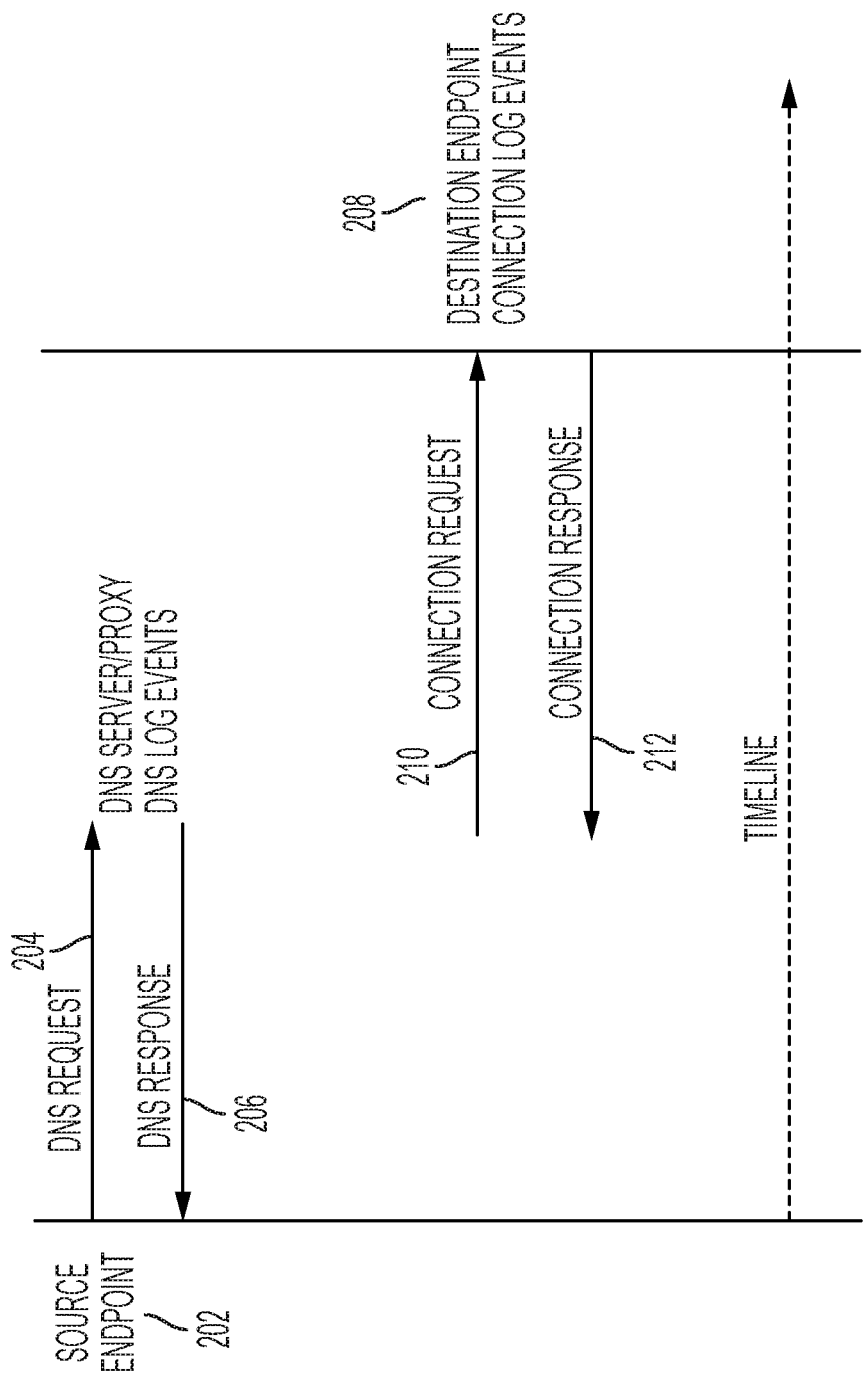
FIG. 2 is a diagram illustrating connection classification in one embodiment, which classifies IoT and non-IoT devices.

FIG. 2 is a diagram illustrating connection classification in one embodiment, which classifies IoT and non-IoT devices. A source endpoint 202 may be a device, which can be classified as IoT or non-IoT device, for instance, based on a DNS request 204 and DNS response 206, whose data may be logged, stored or saved as log events by a server or proxy. A destination endpoint 208 may be another device, which can be classified as IoT or non-IoT device, for instance, based on a connection request 210 and connection response 212, which may be logged, stored or saved as connection log events. For instance, an initial DNS query 204, 206 may obtain an IP address for a given FQDN. A system of the present disclosure in one embodiment stores that FQDN and IP address pair (e.g., in a database). Subsequently, when this IoT device (or another IoT device) uses the IP address in a TCP connection 210, 212, the system would already have stored the mapping from the IP address to the FQDN. The FQDN can then be looked up in the database to determine whether IoT and the flow can be classified as IoT or non-IoT, and also may be classified as other subclasses like "Building" or "Enterprise".

In one embodiment, rules may be generated to discern or determine IoT traffic. For instance, a connection may be marked, tagged or labeled, as IoT or non-IoT flow (e.g., with an associated probability) based on a name of a destination endpoint. For example, a destination endpoint IP may be mapped with a name; Name based distinction (CPE) may be performed; and a name based rule may be generated, for instance, via training. CPE refers to a cognitive processing element that contains an algorithm(s), which may perform artificial intelligence (AI) or machined learning (ML) on captured protocol events. For example, a DNS query returns an FQDN and IP address mapping, which mapping can be stored in a database, for example, on a storage device. Responsive to a TCP connection being setup with an IP address, a system of the present disclosure can look up the associated IP to FQDN in the database. Separately, a set of FQDNs for a given device can be used to build a model using a natural language processing technique, for example TF/IDF. This technique is used to create a training set for a labeled IoT device and rules can be written to associate those FQDN visited by a labeled IoT device(s) as IoT with subclasses like "Building" or "Enterprise". Thus, in one aspect, application of the rule can be used to mark a flow as IoT or non-IoT based on a rule that examines the FQDNs the flow visits.

An endpoint may be marked as IoT device if a number of unique DNS requests observed or received during an epoch (e.g., a configurable time period, e.g., one day) is less than a threshold number (e.g., "x") and names queried occur in IoT only set. In one aspect, IoT devices can have a statistical property that IoT devices visit fewer hosts than traditional information technology (IT) devices. A threshold number of visits can be configured or predefined. If in a given time window the number of servers visited by a device is less than the threshold number for IoT, the device can be classified IoT, otherwise the device can be or traditional IT. Additionally, the names queried can be corroborated as IoT with further sub classing based on a built or trained model, for example, described above. For example, a set of FQDNs for a given device can be used to build a model using a natural language processing technique like TF/IDF. This technique can be used to create a training set for a labeled IoT device and rules can be written to associate those FQDN visited by a labeled IoT device(s) as IoT with further subclassing.

In another aspect, an endpoint may be marked as IoT device if a number of user agent products seen or observed during an epoch (e.g., a configurable time period, e.g., one day) is less than another threshold number (e.g., "y") and names queried are in IoT only set. Similarly, IoT devices have a statistical property that the IoT devices use fewer HTTP user agents than traditional IT devices. A threshold number of HTTP user agent uses can be configured or predefined. Based on observed window of time, if a device's use of user agents does not exceed the configured threshold, the device can be marked as IoT. Additionally, similar to the technique for DNS, a model can be built using TF/IDF of the user agents used by a device. A rule can be applied, which states, if a device uses a given user agent from a known set of IoT HTTP user agents, then the device is considered as an IoT device with further sub classing like "Building" or "Enterprise."

As described above, one or more IoT devices can be discovered based on DNS events (e.g., request and response). In this embodiment, a model may be trained. A DNS model can be trained by creating a corpus of DNS queries associated with a device and applying a natural language technique, for example TF/IDF. The model (also referred to as a reference model) is generated based on labeled training data, DNS queries associated with a device known to be an IoT device. Subsequently, another device (referred to as a test device)'s DNS queries that device has made can be used to generate a vector of DNS queries. The vector of DNS queries associated with this test device can be compared with the reference model, for instance, by performing cosine similarity. The comparison can determine whether the test device is a same device type as the one in the model. A similar technique using TF/IDF can be used for the HTTP protocol using the HTTP user agent. Similarly the same TF/IDF technique can be applied to TLS using the information in the hello handshake query which is transmitted in the clear. A rule can be applied matching the string in question (e.g., DNS, HTTP, TLS based) to a set of IoT devices defined using a TF/IDF model as described above. The TF/IDF model can also be used to classify each individual device further, as device type, device manufacturer, device model, operating system and application. This model can be used to populate a database for fast look up to determine whether a device is an IoT device based on a unary value or set of values (e.g. DNS FQDN, HTTP user agent or URI, TLS cypher suite, host). Rules can be applied using the database to classify a device and associated flow as IoT with sub classing such as "Building" or "Enterprise". Generally, a name based IoT discovery may include mapping an IP to name; looking up a name based on an IP address in the mapping; and performing a rule based classification based on system events such as connect, SSL, handshake, HTTP request, and/or others.

Figure 3:
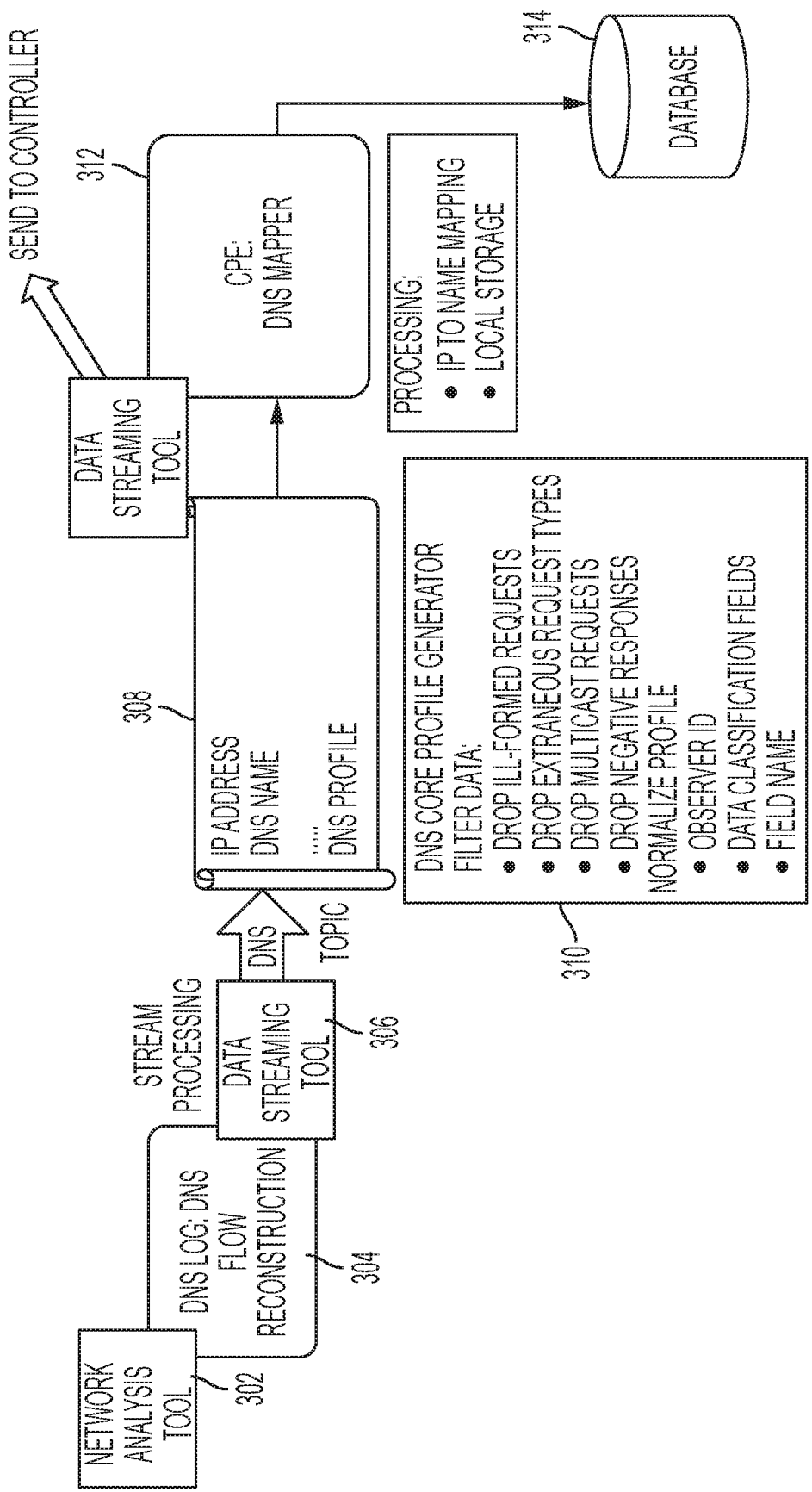
FIG. 3 is a diagram illustrating an IP to name mapping based on DNS requests in one embodiment.

FIG. 3 is a diagram illustrating an IP address to name mapping based on DNS requests in one embodiment. A network analysis tool 302 is also referred to as a protocol analyzer, and creates a log 304 such as DNS log, HTTP Log, TLS/SSL log and log of TCP flows. A data streaming tool 306 may include a publish/subscribe bus, and may subscribe to events from a log 304. An initial profile 308 may be received or streamed by the data streaming tool 306 based on DNS network events. A profile generator 310 builds a data structure, for example, JavaScript Object Notation (JSON) structure, based on fields from DNS data. The profile generator 310 may also filter fields and data that may be considered extraneous. The profile generator 310 further may add fields to the profile such as an identification (ID) of an observer (e.g., shown at 102, FIG. 1) processing the event. A generated profile may be sent to a controller (e.g., 104, FIG. 1). A cognitive processing element (CPE) 312, also referred to as a DNS Manager, builds an IP to name mapping database 314. An IP to name mapping is stored in a local database (DB) and may be referenced for detecting or discovering IoT devices.

In one aspect, IP address to name mapping may be performed by one or more processors or servers functioning as an observer. In this way, for example, site specific response may be captured. For example, many sites may use DNS for directing clients to geographically dispersed servers. IP addresses can be returned based on client locations.

Figure 4:
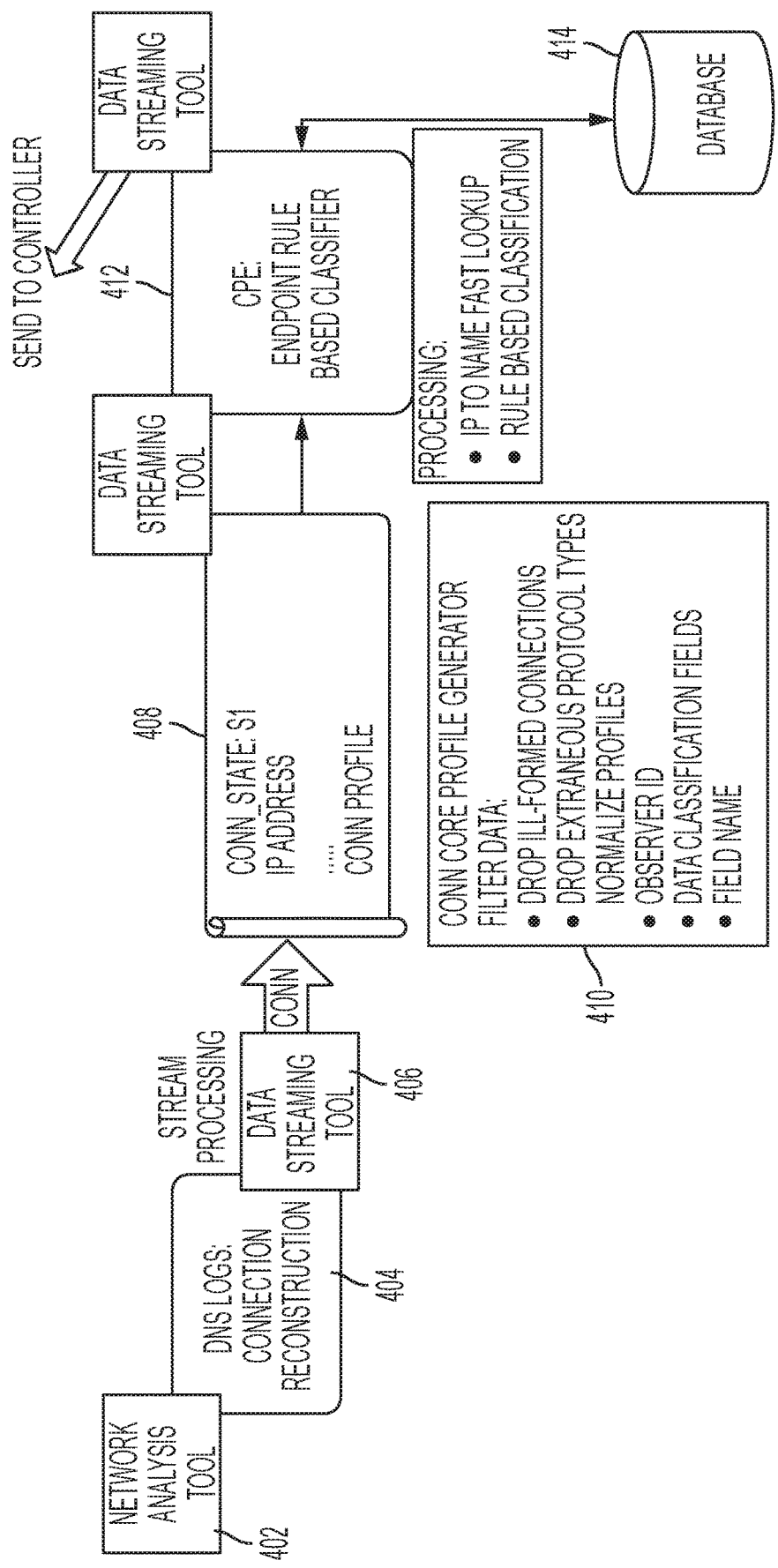
FIG. 4 is a diagram illustrating an IP address to name lookup responsive to a connection request in one embodiment.

FIG. 4 is a diagram illustrating an IP address to name lookup responsive to a connection request in one embodiment. A network analysis tool 402, also referred to as a protocol analyzer, creates a log 404 such as DNS log, which may include connection and reconstruction requests and responses. A data streaming tool 406 may include a publish/subscribe bus, and may subscribe to connection events from the log 404. A profile 408 may be received or streamed by the data streaming tool 406 based on a connection event. A profile generator 410 builds a data structure, for example, JavaScript Object Notation (JSON) structure, based on fields from the connection event. The profile generator 410 may also filter fields and/or data that may be considered extraneous. The profile generator 410 further may add fields to the profile such as an identification (ID) of an observer (e.g., shown at 102, FIG. 1) processing the event, data classification field and field name. Responsive to an arrival of connection request to an IP address, a CPE 410 uses the IP to name mapping database 412 (e.g., locally stored), to lookup the name corresponding to the IP address. The database 412 returns the FQDN of the server being visited by this connection. The CPE 410 performs a rule based classification. For example, the CPE 410 may apply rules to the FQDN returned by the database 412 (e.g., as a unary or a set of FQDN a device is connecting to) in order to compare the returned FQDN to an IoT device listing of IoT FQDNs with sub classes. Classification result may be sent to a controller (e.g., 104, FIG. 1).

In one aspect, a destination (server) endpoint rule based classifier may perform IP to name mapping and perform a name lookup in a rule set. The classifier may determine whether a device is IoT, not IoT, whether it is indeterminate, or whether the name is unseen.

Data filtering, for example, obtaining data from which IoT may be discovered, may include implementing and executing packet capture (PCAP). PCAP may include an application programming interface (API) for capturing network traffic. The network traffic data may be split into IoT and non-IoT data. For instance, the network traffic data may be filtered based on IP subnet, for example, adjusted to exclude router, and non-IoT and IoT data from the captured packet may be identified. In addition, DNS log data may be received, which may include Non-IoT DNS log, Non-IoT Connection log, IoT DNS log, and IoT connection log. Post-processing of the data identifies Non-IoT DNS, Non-IoT Connection, IoT DNS and IoT connection data.

Figure 5:
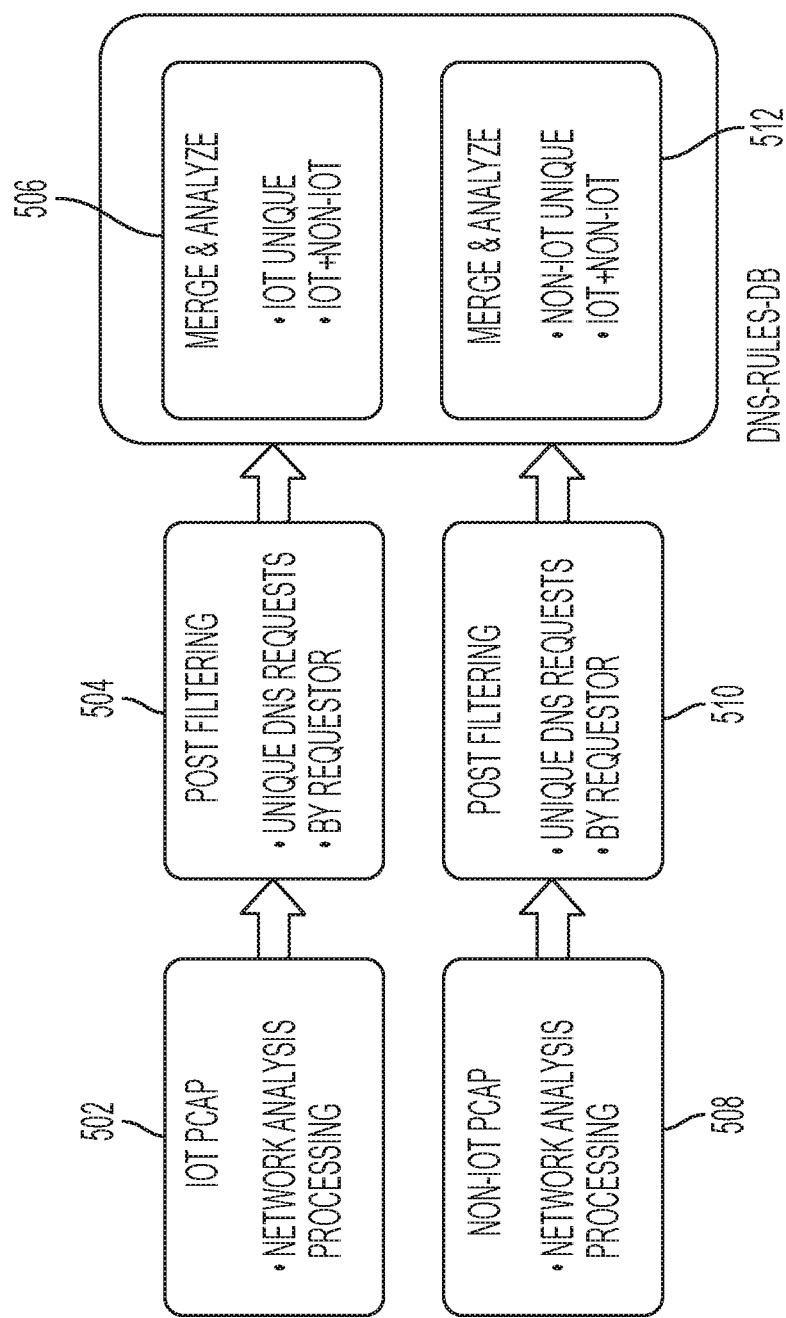
FIG. 5 is a diagram illustrating model training in one embodiment.

FIG. 5 is a diagram illustrating model training in one embodiment. As described above, a model can be built using a natural language processing technique, for example TF/IDF. A model per protocol can be built using events from DNS queries, HTTP user agent and/or URI and TLS hello handshake like cypher suites. As an example, in the case of DNS, a device labeled as IoT from an IoT PCAP or IoT datastream makes queries to a set of FQDN during a given time window. A corpus of those queries is created and vectorized using TF/IDF. Subsequently, when a target device (also referred to as a test device) is being classified the corpus of queries the target device makes can be compared using cosine similarity against the vector created during training. The result is the probability the target device is a match with the original training set. Further, the FQDN associated with a device labeled as IoT can be added to a set. Subsequently, when a TCP connection request is made with IP address, a look up can be performed to find the FQDN of the IP address in the local database. Then a comparison of the string with the known set of IoT FQDNs can be used to classify the flow as IoT with sub classing. While the above example described a DNS mode, the present method and system does not limit a model to a DNS model. Rather, the method and system in the present disclosure may create TF/IDF model based on other protocols, e.g., HTTP or TLS headers, and build up an associated IoT list with HTTP header or TLS header information. For example a list of HTTP user agents or digest of TLS cypher suites may be put in an IoT list. If the device uses a unary or set of HTTP user agent or a digest of cypher suites, the method and/or system may compare the use to the list and mark the device and associated TCP flow as IoT or non-IoT.

Referring to FIG. 5, at 502, queries made by a device labeled as IoT to a set of FQDN during a given time window, may be detected. At 504, data in the queries may be filtered and/or processed. At 506, analysis may be performed for identifying IoT or non-IoT devices. Similarly, at 508, queries made by a device labeled as non-IoT to a set of FQDN during a given time window, may be detected. At 510, data in the queries may be filtered and/or processed. At 512, analysis may be performed for identifying IoT or non-IoT devices.

Figure 6:
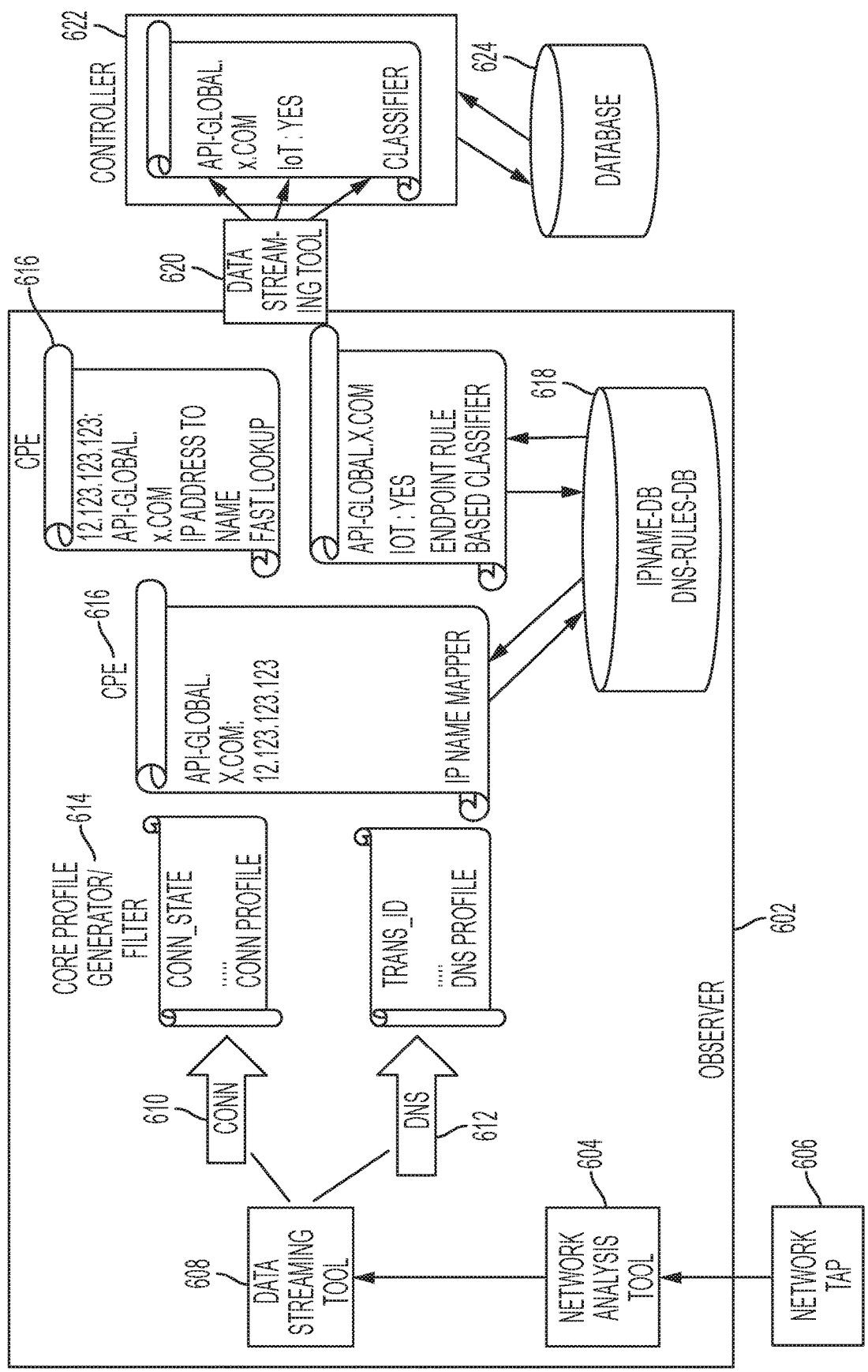
FIG. 6 is a diagram illustrating components of DNS based IoT data discovery in one embodiment.

FIG. 6 is a diagram illustrating components of DNS based IoT data discovery in one embodiment. An observer component 602 (e.g., also shown in FIG. 1 at 102) may include a network analysis component 604, which may receive data from a network test access point (tap) 606. One or more functions the network analysis component 604 may perform may include, but is not limited to, one or more functions performed by Bro from International Computer Science Institute in Berkeley, Calif. and the National Center for Supercomputing Applications in Urbana-Champaign, Ill., which performs network security monitoring and network traffic analysis. A data streaming component or tool 608 may stream data from the network analysis component 604, for example, subscribe different types of data from the network analysis component 604 and publish the data to a core profile generator and filter component 614. In one aspect, a mechanism similar to a message queue or the like may be implemented to receive and send data. For instance, a data streaming component 608 may subscribe to and publish topics such as connection 610 and DNS 612. An example tool, which may be employed, may include Kafka, a publish/subscribe bus, from Apache Software Foundation.

A core profile generator and filter component 614 extracts and filters data. A profile generator 614 (also referred to as a protocol processing element (PPE)) may build or construct a JSON structure from the protocol header fields from an event for a given protocol, e.g. (but not limited to), TCP, DNS, HTTP or TLS. In cases in which multiple network analyzers are used, the profile generator 614 maps the header to a common data abstraction in JSON. The profile generator t14 may add an observer ID, which indicates where (which computer, device or processing element) the event was processed to allow tracing of a profile that has multiple components. The generator 114 may also filter fields (e.g., those which may be considered extraneous) from the protocol to construct the JSON structure. Table 1 shows an example of an initial profile on data filtered from a raw protocol event before the system applies CPE algorithms to further classify the event (data flow). While the host and port numbers are shown with "#" characters in the Table, an initial profile would contain real digits (numbers) to reflect the corresponding host address and port numbers.

TABLE 1

| @timestamp | May 23, 2019, 09:13:25.133 |
| application | Web browser F |
| device_id | 99:99:99:99:99:99 |
| id.orig_h | ##.#.##.## |
| id.orig_p | ##.### |
| id.resp_h | ###.###.##.### |
| id.resp_p | 80 |
| method | GET |
| use_agent | Dalvik/2.1.0 (Linux; U; Android 7.0; SM-G930V Build/NRD90M) |

An observer 602 may also run one or more classifiers 616 (e.g., a trained model) based on the extracted and/or filtered data. One or more classifiers 616 can classify whether a network point is IoT or non-IoT, possibly with a probability or confidence factor. A cognitive processing element (CPE) 616 in some embodiments includes an algorithm, for example, implemented as software or programmed hardware. CPE 616 may perform a lookup on stored IP-to-name information in a local database (DB) 618 and may apply rules to that name in order to define the connection and/or device as IoT versus (vs.) non-IoT. In another aspect, CPE 616 may be AI and ML based, which may perform a comparison of a device protocol information observed against a trained TF/IDF model. That model can be used to classify a device as device type, device manufacturer, device model, operating system or application (e.g., laptop, Company A, laptop model M, Operating System O, Web browser C). A list of IoT devices and the associated HTTP or TLS data (e.g., names) can be created drawing on the TF/IDF models. Device protocol information can be compared to the list to classify device and associated TCP flows as IoT or non-IoT with sub classes.

A storage device 618 may store a database of IP names and a database of DNS rules. In one embodiment, the database may be, but is not limited to, a cloud database. Database of IP names can be built, for example, during DNS request/response processing (e.g., shown at 202, 204 and 206 in FIG. 2). CPE 616 can look up the IP address from the TCP connection as input to the database of IP names, and FQDN can be the output from the database. Rules can be applied on the FQDN unary or set of FQDN used by the device to match a list of known FQDN from IoT devices in order to classify the connection and/or associated device as IoT or non-IoT with sub classes.

An observer 602 may send classified data to a controller 622. For instance, a stream processing component 620 may send data to a controller 622. A controller 622 may receive the data from one or more observers (e.g., 620) and use the data to train (or retrain) one or more models or classifiers. A controller 622 may receive data from a plurality of observers (e.g., disparage sources) and combine the data. A model or a classifier trained by a controller 622 may be deployed to one or more observers, for example, to an observer 602.

A storage device 624 may store trained models and data used to train models. In one aspect, a database management system such as a NoSQL (Non Structured Query Language) database management system may manage and store data. In one aspect, automated computer agents may run and discover IoT traffic and/or device.

Figure 7:
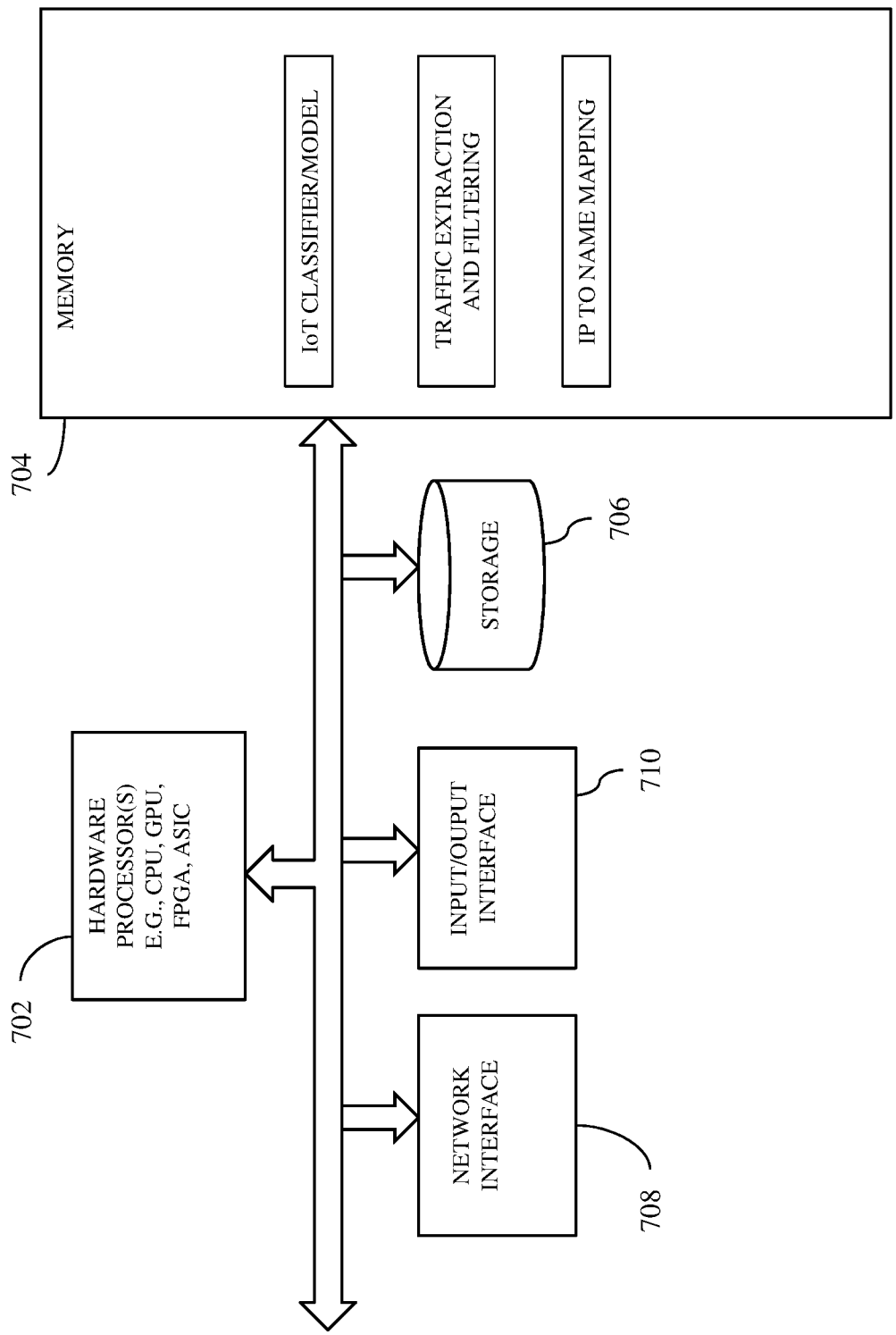
FIG. 7 is a diagram showing components of a system in one embodiment that may perform name based IoT data discovery.

FIG. 7 is a diagram showing components of a system in one embodiment that may perform name based IoT data discovery. One or more hardware processors 702 such as a central processing unit (CPU), a graphic process unit (GPU), and/or a Field Programmable Gate Array (FPGA), an application specific integrated circuit (ASIC), and/or another processor, may be coupled with a memory device 704, and generate a prediction model and recommend communication opportunities. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 704 may, for example, store instructions and/or data for functioning of the one or more hardware processors 702, and may include an operating system and other program of instructions and/or data. One or more hardware processors 702 may receive input comprising computer network traffic data. For instance, at least one hardware processor 602 may extract and filter network traffic data, and run a classifier to discover IoT and non-IoT traffic. In one aspect, data processed by one or more hardware processors 702 may be stored in a storage device 706 or received via a network interface 708 from a remote device, and may be temporarily loaded into the memory device 704. One or more hardware processors 702 may be coupled with interface devices such as a network interface 708 for communicating with remote systems, for example, via a network, and an input/output interface 710 for communicating with input and/or output devices such as a keyboard, mouse, display, and/or others.

Figure 8:
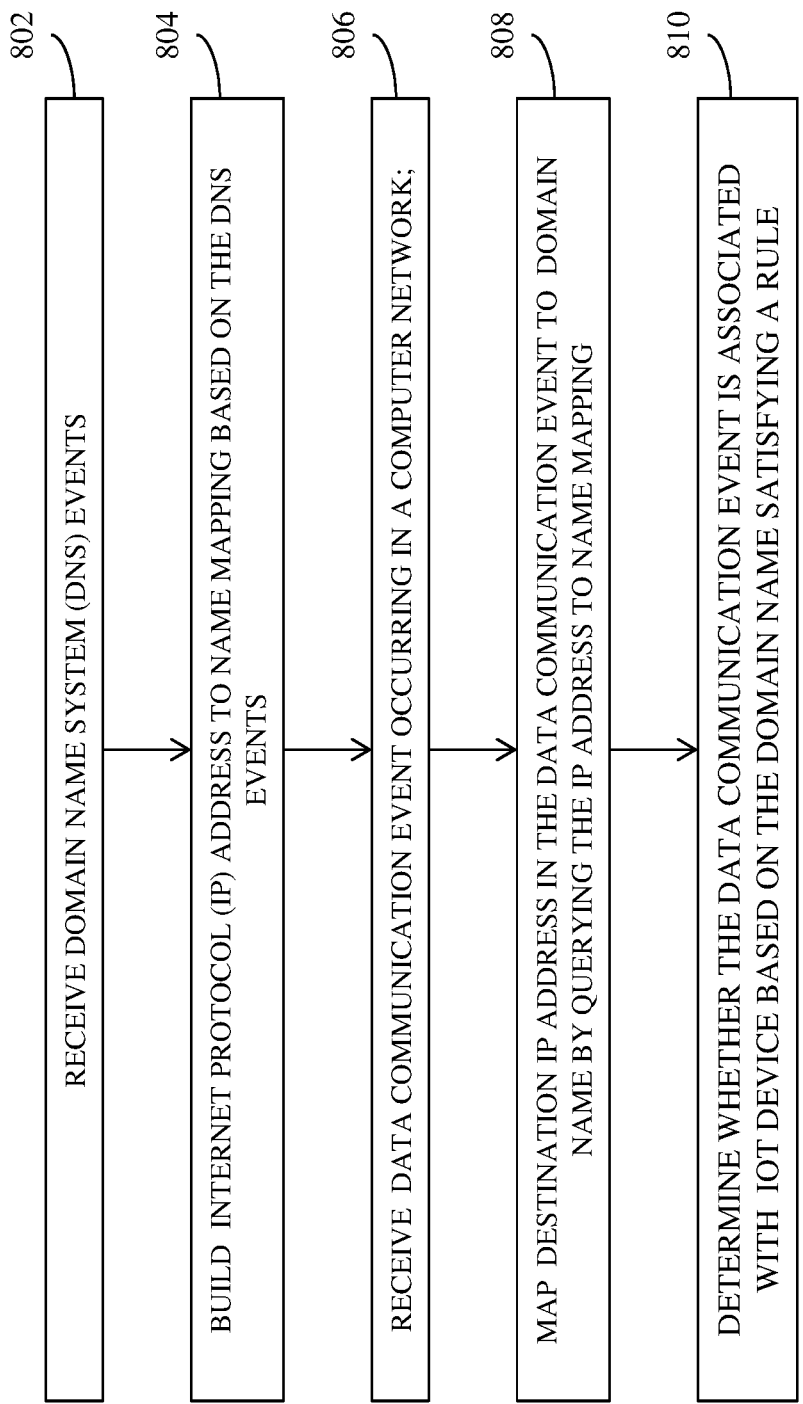
FIG. 8 is a flow diagram illustrating a method in one embodiment.

FIG. 8 is a flow diagram illustrating a name based IoT discovery method, in one embodiment. The method may be executed by at least one hardware processor, for instance, coupled to a memory device. At 802, domain name system (DNS) events are received. At 804, an Internet Protocol (IP) address to name mapping is built based on the DNS events. In one aspect, the IP address to name mapping may be stored in a database, for example, on a storage device. At 806, a data communication event occurring in a computer network may be received. At 808, a destination IP address in the data communication event is mapped to a domain name by querying the IP address to name mapping. At 810, whether the data communication event is associated with an IoT device is determined based on the domain name satisfying a rule. For instance, based on the domain name satisfying a rule, it can be determined whether a source of the data communication event is an IoT device. Similarly, based on the domain name satisfying a rule, it can be determined whether the data communication event is IoT data traffic. In one aspect, as described above, a database of domain names, which IoT devices visit, can be built or generated. A rule may provide that if the domain name matches with a name in the database of domain names, an IoT device is discovered, for example, the source of the data communication event is an IoT device, and/or the data communication event is IoT data traffic. In another aspect, as described above, a model may be trained which includes values associated with web sites, which IoT devices visit. A rule may provide that if a profile associated with the data communication event matches to the model (e.g., to a degree based on a similarity threshold), an IoT device is discovered. Matching of profile data to the model may further classify the discovered IoT device by device type, device manufacturer, device model, operating system, and application. In one aspect, the data communication event may include a hypertext transfer protocol (HTTP) event. In another aspect, the data communication event may include a Secure Sockets Layer (SSL) event. There may be separate models built for different application protocol events.]

Figure 9:
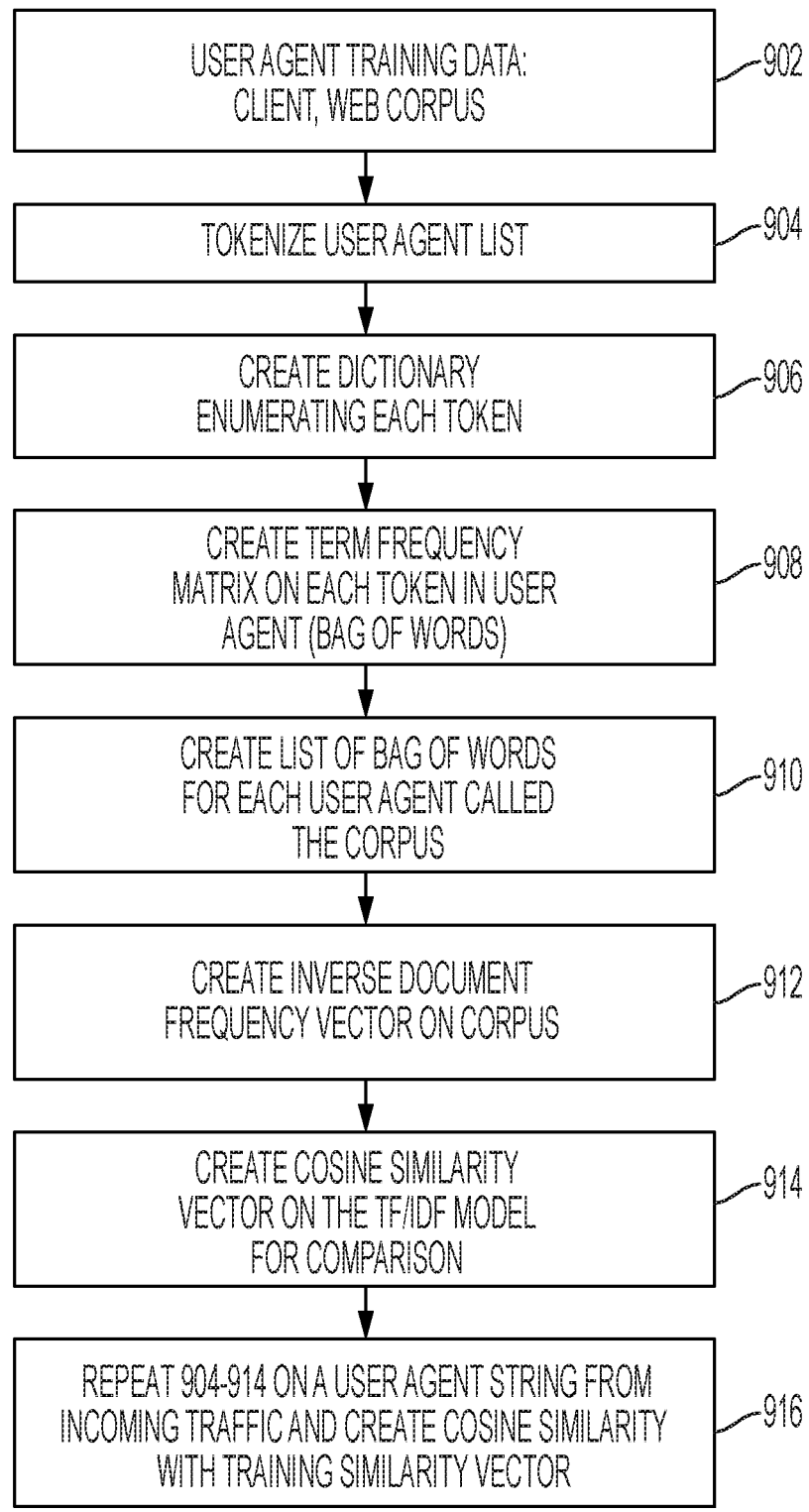
FIG. 9 is a diagram showing term frequency-inverse document frequency (TF/IDF) text processing, which creates a trained model for classifying IoT devices in one embodiment.

FIG. 9 is a diagram showing TF/IDF text processing in one embodiment. As an example, the logic shown in FIG. 9 can process HTTP events. In one embodiment, TF/IDF text processing provides for a generalized technique to classify IoT devices using HTTP user agents from a set of labeled training data. In some embodiments, a model may be created on a controller device (e.g., shown in FIG. 1), and classification may be performed on an observer device (e.g., shown in FIG. 1). At 902, a labeled set of user agent strings may be received which enable comparison with strings from the wild (e.g., incoming traffic) for classification. At 904, user agent list is tokenized. At 906, a dictionary enumerating each token is created. At 908, a term frequency matrix on each token in user agent (bag of words) is created. At 910, a list of bag of words for each user agent is created and referred to as a corpus. The processing at 904, 906, 908 and 910, in one aspect, emphasize importance of a token (word) in a user agent string. For example, more frequently occurring token is given more importance. At 912, Inverse Document Frequency vector on the corpus is created. This IDF step also corrects for tokens (words) such as punctuations, which occur in all user agent strings and assigns less weight to those tokens (words). At 914, a cosine similarity vector on the TF/IDF model is created for comparison. At 916, processing from 904-914 is repeated on a user agent string from the wild (e.g., incoming traffic) and cosine similarity is created with training similarity vector. Processing at 914 and 916 allow comparing user agent string from the wild with labeled strings. For example, [(0, 1.0), . . . ] indicates user agent indexed at 0 in the vector is an exact match.

It is estimated that that there will be a large number, for instance, tens of billions of interconnected IoT devices in the near future. To a service provider or a cloud provider, for instance, knowing which IoT devices are connected in a system, facilitates the service provider or cloud provider's functions in providing its service. The ability to quickly discover and manage a subset of IoT devices serviced by a cloud provider may be enhanced with automation in the discovery process. Automated discovery may also help such service provider or cloud provider in understanding the behavior, data flow, security and other characteristics of a system.

Figure 10:
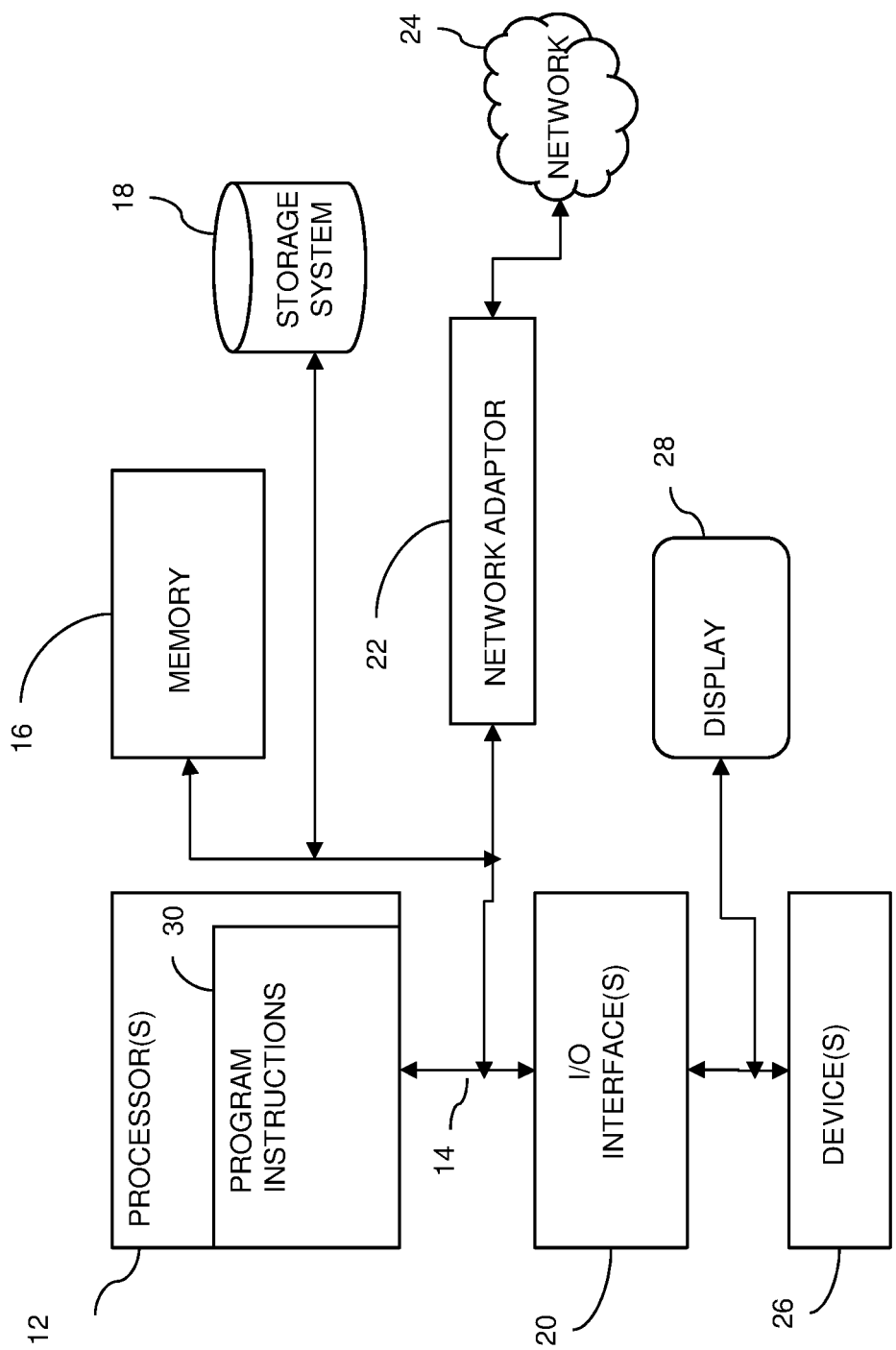
FIG. 10 illustrates a schematic of an example computer or processing system that may implement a name based IoT data discovery system in one embodiment.

FIG. 10 illustrates a schematic of an example computer or processing system that may implement a name based IoT data discovery system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
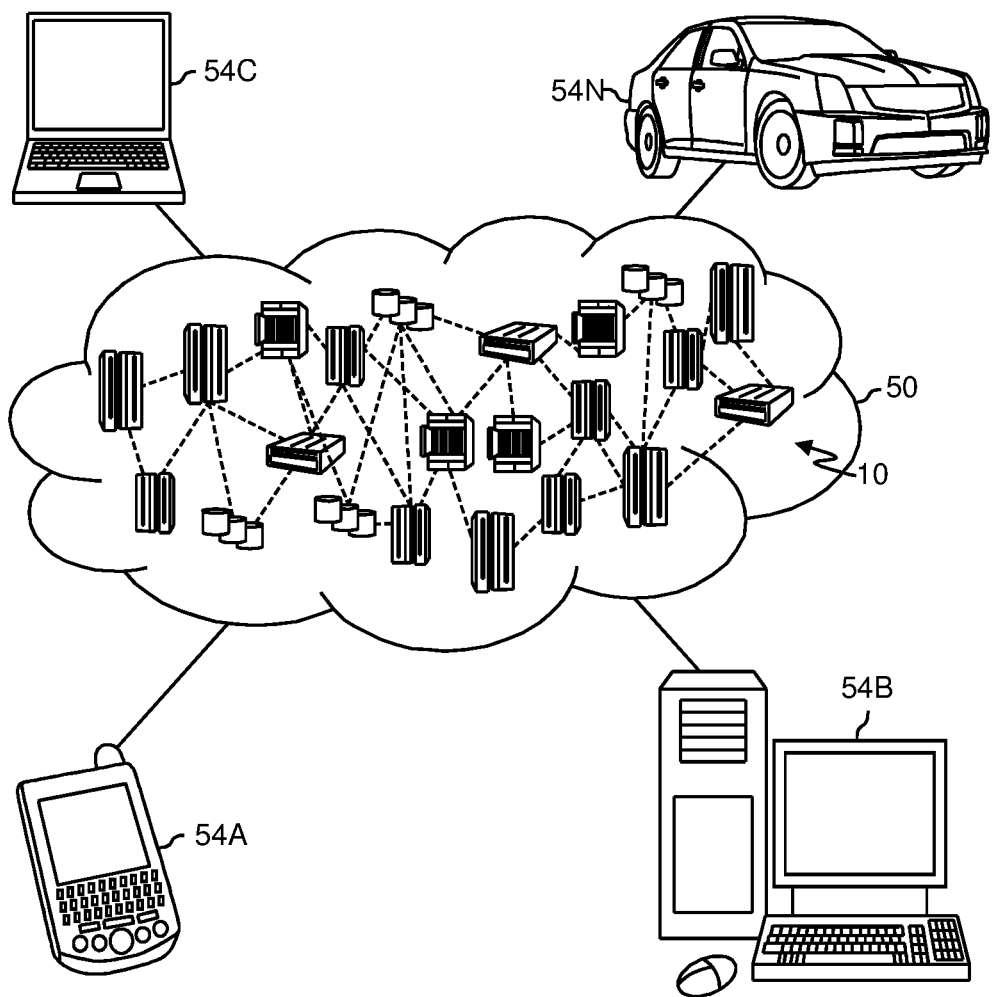
FIG. 11 illustrates a cloud computing environment in one embodiment.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
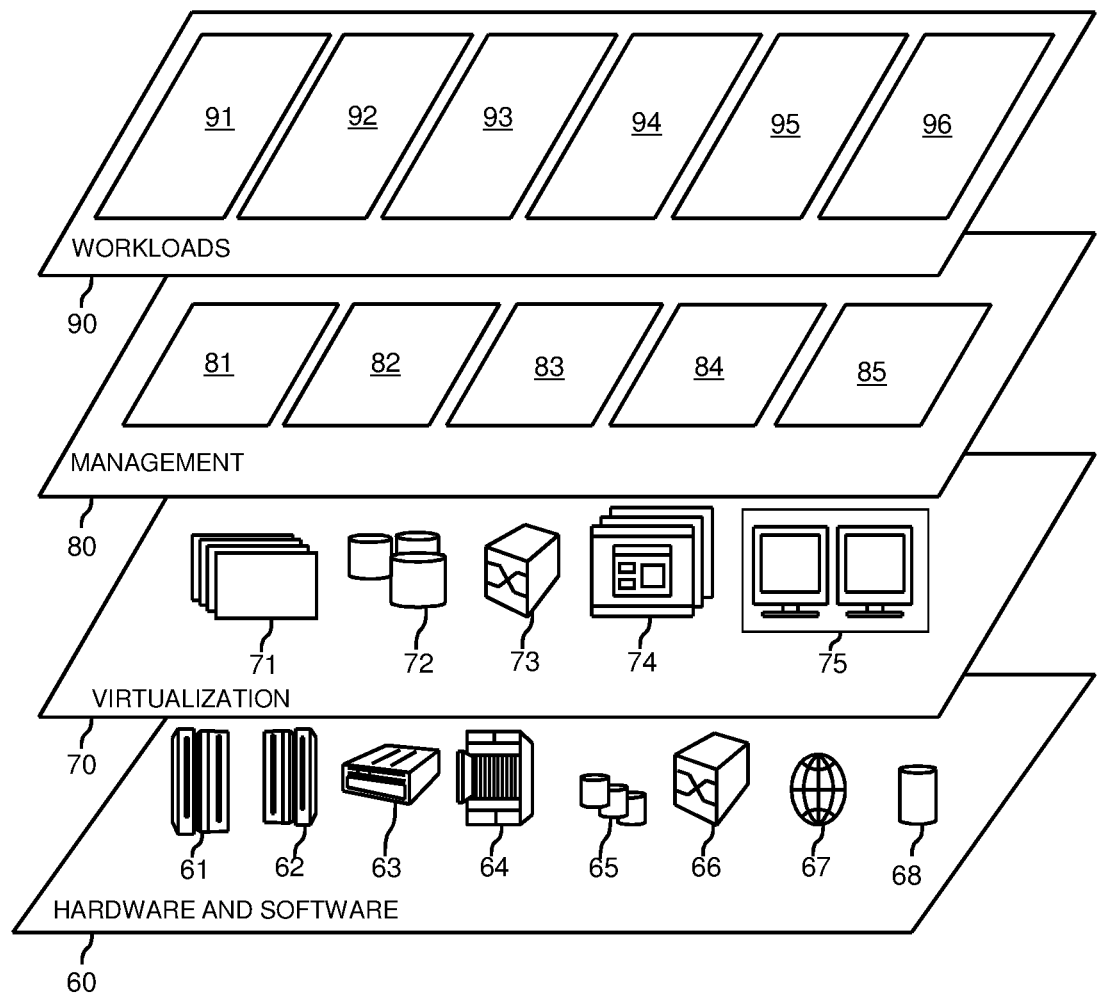
FIG. 12 illustrates a set of functional abstraction layers provided by cloud computing environment in one embodiment of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IoT discovery processing 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method executed by at least one hardware processor, the method comprising:
   receiving domain name system (DNS) events;
   building an Internet Protocol (IP) address to name mapping based on the DNS events;
   receiving a data communication event occurring in a computer network;
   mapping a destination IP address in the data communication event to a domain name by querying the IP address to name mapping; and
   determining whether the data communication event is associated with an IoT device based on the domain name satisfying a rule.

2. The method of claim 1, wherein the determining whether the data communication event is associated with an IoT device, comprises determining whether a source of the data communication event is an IoT device based on the domain name satisfying a rule.

3. The method of claim 1, wherein the determining whether the data communication event is associated with an IoT device, comprises determining whether the data communication event is an IoT data traffic based on the domain name satisfying a rule.

4. The method of claim 1, further comprising building a database of domain names, which IoT devices visit, and the rule comprises finding the domain name match in the database of domain names.

5. The method of claim 1, further comprising building a model comprising values associated with sites, which IoT devices visit, and the rule comprises matching profile data associated with the data communication event to the model.

6. The method of claim 5, wherein the matching of the profile data associated with the data communication event to the model further classifies the IoT device as device type, device manufacturer, device model, operating system, and application.

7. The method of claim 1, wherein the data communication event comprises a hypertext transfer protocol (HTTP) event.

8. The method of claim 1, wherein the data communication event comprises a Secure Sockets Layer (SSL) event.

9. A computer readable storage medium storing a program of instructions executable by a machine to perform a method comprising:
   receiving domain name system (DNS) events;
   building an Internet Protocol (IP) address to name mapping based on the DNS events;
   receiving a data communication event occurring in a computer network;
   mapping a destination IP address in the data communication event to a domain name by querying the IP address to name mapping; and
   determining whether the data communication event is associated with an IoT device based on the domain name satisfying a rule.

10. The computer readable storage medium of claim 9, wherein the determining whether the data communication event is associated with an IoT device, comprises determining whether a source of the data communication event is an IoT device based on the domain name satisfying a rule.

11. The computer readable storage medium of claim 9, wherein the determining whether the data communication event is associated with an IoT device, comprises determining whether the data communication event is an IoT data traffic based on the domain name satisfying a rule.

12. The computer readable storage medium of claim 9, further comprising building a database of domain names, which IoT devices visit, and the rule comprises finding the domain name match in the database of domain names.

13. The computer readable storage medium of claim 9, further comprising building a model comprising values associated with sites, which IoT devices visit, and the rule comprises matching profile data associated with the data communication event to the model.

14. The computer readable storage medium of claim 13, wherein the matching of the profile data associated with the data communication event to the model further classifies the IoT device as device type, device manufacturer, device model, operating system, and application.

15. The computer readable storage medium of claim 9, wherein the data communication event comprises a hypertext transfer protocol (HTTP) event.

16. The computer readable storage medium of claim 9, wherein the data communication event comprises a Secure Sockets Layer (SSL) event.

17. A system comprising:
a hardware processor coupled with a memory device, the hardware processor configured to at least:
receive domain name system (DNS) events;
build an Internet Protocol (IP) address to name mapping based on the DNS events;
receive a data communication event occurring in a computer network;
map a destination IP address in the data communication event to a domain name by querying the IP address to name mapping; and
determine whether the data communication event is associated with an IoT device based on the domain name satisfying a rule.

18. The system of claim 17, wherein the hardware processor determines whether a source of the data communication event is an IoT device based on the domain name satisfying a rule.

19. The system of claim 17, further comprising a database storing domain names, which IoT devices visit, and the rule comprises finding the domain name match in the database storing domain names.

20. The system of claim 17, further comprising an in-memory model comprising values associated with sites, which IoT devices visit, and the rule comprises matching profile data associated with the data communication event to the model.

* * * * *

UNITED STATES PATENT AND TRADEMARK OFFICE
CERTIFICATE OF CORRECTION

PATENT NO.         : 10,735,370 B1
APPLICATION NO.    : 16/288869
DATED              : August 4, 2020
INVENTOR(S)        : Kandlur et al.

Page 1 of 1

It is certified that error appears in the above-identified patent and that said Letters Patent is hereby corrected as shown below:

On the Title Page

(72) Inventors should read:
Dilip Dinkar Kandlur, San Jose, CA (US);
Douglas M. Freimuth, New York, NY (US);
Franck Vinh Le, White Plains, NY (US);
Erich Nahum, New York, NY (US);
Jorge Jose Ortiz, Rego Park, NY (US)

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*